United States Patent [19]

Cross et al.

[11] Patent Number: 5,757,564
[45] Date of Patent: May 26, 1998

[54] COATINGS ON GLASS

[75] Inventors: Raymond Peter Cross, Preston; Steven John Reilly, St. Helens.; Timothy Jenkinson, Greater Manchester, all of United Kingdom

[73] Assignees: Pilkington Glass Limited; Pilkington PLC, both of Merseyside, United Kingdom

[21] Appl. No.: 370,412

[22] Filed: Jan. 9, 1995

[30] Foreign Application Priority Data

Jan. 10, 1994 [GB] United Kingdom ............... 9400319

[51] Int. Cl.$^6$ ............................. G02B 5/08; G02B 7/182
[52] U.S. Cl. ......................... 359/870; 359/871; 359/883
[58] Field of Search .................................. 359/584, 585, 359/603, 870, 883, 884, 871

[56] References Cited

U.S. PATENT DOCUMENTS

| | | |
|---|---|---|
| 2,519,722 | 8/1950 | Turner . |
| 2,558,848 | 7/1951 | Harrison ..................... 359/883 |
| 3,427,095 | 2/1969 | Dykema et al. ............... 359/870 |
| 3,427,096 | 2/1969 | Dykema et al. ............... 359/870 |
| 3,985,429 | 10/1976 | Fleischer .................... 359/870 |
| 4,188,444 | 2/1980 | Landau . |
| 4,312,570 | 1/1982 | Southwell . |
| 4,400,326 | 8/1983 | Daudt et al. . |
| 4,419,386 | 12/1983 | Gordon . |
| 4,511,618 | 4/1985 | Duchene et al. .............. 359/883 |

(List continued on next page.)

FOREIGN PATENT DOCUMENTS

| | | |
|---|---|---|
| 0372405 | 6/1990 | European Pat. Off. . |
| 0372438 | 6/1990 | European Pat. Off. . |
| 0397292 | 11/1990 | European Pat. Off. . |
| 0456488 | 11/1991 | European Pat. Off. . |
| 0482933 | 4/1992 | European Pat. Off. . |
| 0522785 | 1/1993 | European Pat. Off. . |
| 0562660 | 9/1993 | European Pat. Off. . |
| 0583871 | 2/1994 | European Pat. Off. . |
| 2382511 | 9/1978 | France . |
| 2391173 | 12/1978 | France . |
| 1421392 | 3/1969 | Germany . |
| 1913901 | 4/1970 | Germany . |
| 3928939 | 3/1990 | Germany . |
| 3941859 | 1/1991 | Germany . |
| 977820 | 12/1964 | United Kingdom . |
| 1262163 | 2/1972 | United Kingdom . |

(List continued on next page.)

OTHER PUBLICATIONS

J. Stone and L.W. Stulz: Reflectance, transmittance, and loss spectra of multilayer SiSio$_2$ thin film mirrors and antireflection coatins for 1.5μm *Applied Optics*, Feb. 1, 1990, vol. 29, No. 4, pp. 583–588.

Martin et al: Optical Properties of Thin Amorphous Silicon and Amorphous Hydrogenated Silicon Films Produced By Ion Beam Techniques *Electronics And Optics*, Thin Solid Films, 100 (1983), pp. 141–147.

Cartwright et al Abstract: *Multilayer Films of High Reflecting Power*, Physical Review, col. 55, 1939, p. 1128.

Asahi Glass Co.: Chemical Abstracts, vol. 110, No. 6, Feb. 6,1989, Columbus, Ohio; Abstract No. 42057, p. 187 (JP 63195149, Aug. 12, 1988).

Asaka Glass Sangyo—(Abstract) Derwent Publications Ltd., AN 88–039167 and JP 62297242, Dec. 24, 1987.

*Primary Examiner*—Ricky D. Shafer
*Attorney, Agent, or Firm*—Howrey & Simon; Joel M. Freed

[57] ABSTRACT

A mirror assembly comprising a glass substrate, a low transmissivity reflecting coating on the substrate and an opacifying member which is assembled adjacent to the glass substrate for a front surface mirror or the reflecting coating for a back surface mirror. The present invention also provides a method of producing a mirror assembly comprising depositing onto a hot ribbon of glass during the production process a low transmissivity reflecting coating and assembling an opacifying member adjacent to the glass substrate or the reflecting coating of the mirror so formed.

9 Claims, 2 Drawing Sheets

U.S. PATENT DOCUMENTS

| | | | |
|---|---|---|---|
| 4,532,937 | 8/1985 | Miller | 128/759 |
| 4,019,887 | 4/1977 | Kirkbride et al. | |
| 4,546,019 | 10/1985 | Schneider. | |
| 4,638,043 | 1/1987 | Szycher et al. | 528/75 |
| 4,661,381 | 4/1987 | Callies et al. | |
| 4,673,248 | 6/1987 | Taguchi et al. | |
| 4,763,930 | 8/1988 | Matney | 283/81 |
| 4,847,157 | 7/1989 | Goodman et al. | |
| 4,919,778 | 4/1990 | Dietrich et al. | |
| 4,921,331 | 5/1990 | Nakajima | 359/884 |
| 5,128,194 | 7/1992 | Sorko-Ram | 359/883 |
| 5,143,445 | 9/1992 | Bateman et al. | |
| 5,168,003 | 12/1992 | Proscia. | |
| 5,179,471 | 1/1993 | Caskey et al. | 359/603 |
| 5,283,696 | 2/1994 | Lanser et al. | 359/870 |
| 5,300,174 | 4/1994 | Leach et al. | |
| 5,505,989 | 4/1996 | Jenkinson | 427/166 |
| 5,535,056 | 7/1996 | Caskey et al. | 359/883 |
| 5,576,885 | 11/1996 | Lowe et al. | 359/585 |

FOREIGN PATENT DOCUMENTS

| | | |
|---|---|---|
| 1507465 | 4/1978 | United Kingdom. |
| 1507996 | 4/1978 | United Kingdom. |
| 1564618 | 4/1980 | United Kingdom. |
| 2033374 | 5/1980 | United Kingdom. |
| 1573154 | 8/1980 | United Kingdom. |
| 2135697 | 9/1984 | United Kingdom. |
| 2209176 | 5/1989 | United Kingdom. |
| 2229738 | 3/1990 | United Kingdom. |
| 2224366 | 5/1990 | United Kingdom. |
| 2225343 | 5/1990 | United Kingdom. |
| 2227029 | 7/1990 | United Kingdom. |
| 2247691 | 3/1992 | United Kingdom. |
| 2248853 | 4/1992 | United Kingdom. |
| 8701970 | 4/1987 | WIPO. |
| 91/10563 | 7/1991 | WIPO. |
| 91/16197 | 10/1991 | WIPO. |
| WO91/14662 | 10/1991 | WIPO. |
| 93/20165 | 10/1993 | WIPO. |

COATINGS ON GLASS

BACKGROUND TO THE INVENTION

The invention relates to a method of producing mirrors, and to coated glass substrates incorporating highly reflecting "mirror" coatings. The invention particularly relates to the application of an obscuring layer to a back surface of a mirror.

The light reflecting properties of mirrors are generally provided by a layer of highly reflecting metal, especially silver, aluminium or chromium, applied to a glass or plastics substrate; copper layers are sometimes used as an alternative, but are generally less acceptable because of the strong red tint of the reflected light.

Silver coatings are generally applied to preformed glass plates, in the cold, by wet chemical methods in which a solution of silver salt is applied to the glass surface and reacted with a reducing agent which reduces silver ions present to silver metal which deposits on the glass surface. The silver used is not very durable in use and in practice requires protection by other layers, and these methods are generally unsuitable for application to glass on the production line i.e. the float line on which it is formed so that a separate "silvering" line is required to produce the silvered glass.

Aluminium coatings are difficult to apply by chemical methods because of the strongly reducing nature of aluminium metal, and aluminium mirrors are generally produced by deposition methods carried out at low pressure e.g. by sputtering. Such low pressure methods are essentially batch processes and, like the wet chemical methods used for deposition of silver mirrors, are generally unsuitable for on-line application on the production line on which the glass is made.

GB 2248853A discloses a method of coating glass with aluminium to form a mirror. A solution of an alane amine adduct of aluminium is formed and the liquid is deposited onto heated glass. The adduct decomposes to form an aluminium coating. Although it is stated that it is envisaged that the invention may be used in conjunction with float glass production, there is no exemplification of such a use. It is believed that substantial technical problems could be encountered in simply introducing the disclosed aluminium compounds into a float glass line.

Known mirrors using a highly reflective metal layer in a back surface (Face 2) mirror construction typically employ two paint coatings over the metal layer. For a typical silvered mirror, the silver coating is covered with a copper metal coating which is in turn covered with two paint coatings. The paint coatings, which are typically oil based comprised of short oil alkyds, are applied to the metal layers in order chemically to protect the metal layer from corrosion and, to a lesser extent, to protect the metal layers from physical damage. The reflecting metal layers employed in the known mirrors are opaque to visible light and thus the paint coatings employed in the prior art are selected so as to provide chemical or corrosion protection to the metal layers and are not formulated so as to provide any opacification in the mirror. Two paint layers are generally required in order to provide the necessary chemical protection of the metal layer or layers.

It is known to provide such silvered mirrors with safety properties, i.e. impact resistance and an ability to retain together glass fragments of the mirror when broken by an impact so that the fragments do not fall away and cause injury, by adhering to the back surface over the paint layers a self-adhesive plastics film. Such known films typically comprise self-adhesive polyolefin or polyester films. The films simply provide safety properties as an add-on feature to the known mirror constructions.

Silicon layers have also been used to produce reflecting layers (which, like silver and aluminium layers, are substantially neutral in reflection colour) on architectural glazing for aesthetic and solar control purposes. GB 1507465, 1507996 and 1573154 relate to a continuous chemical vapour deposition method for producing float glass having such a silicon layer, and U.S. Pat. No. 4,661,381 describes a development of that method. However, such silicon layers do not provide the high reflections commonly required in mirrors. Thus REFLECTAFLOAT (trade mark) glass, commercially available from Pilkington Glass Limited of St. Helens, England, has a reflection of about 50%, and MIRROPANE EP (trade mark) commercially available from Libbey-Owens-Ford Co. has a reflection of about 60%.

None of the above technology is currently suitable for the application of highly reflecting coatings to glass during the glass production process to provide a coated glass substrate with a light reflection of over 70%, and preferably over 80%.

On a completely different scale, it has been proposed in GB 1262163, to produce very highly reflecting (greater than 90%) "cold light" mirrors comprising silicon layers for use, for example in cinema projectors, for separating heat radiation from visible light. Such cold light mirrors are produced by vacuum deposition on thin bases, typically glass substrates 3 mm thick or less, and are used without any backing paint to minimise build up of heat in the glass. GB 1262163 refers, in discussing the prior art, to a known cold light mirror comprising a "purest silicon layer" covered by four to six alternate layers of silicon oxide and tantalum oxide or titanium oxide but concludes that, for a satisfactory product, substantially more layers would be required. It therefore proposes to achieve the very high reflection (greater than 90%) required in a different way using several silicon layers as the individual layers of high refractive index of a multilayer interference system.

Much more recently, it has been proposed by J. Stone and L. W. Stulz (Applied Optics, Feb. 1990, Volume 29, No. 4) to use quarter wavelength stacks of silicon and silica layers for mirrors in the spectral region between 1.0 and 1.6 microns (i.e. within the infra red). However, the authors observe that silicon cannot be used at wavelengths below about 1 micron (and thus not in the visible region of the spectrum) due to its high absorption at such wavelengths. Stone and Stulz refer to the deposition of $Si/SiO_2$ by low pressure methods such as reactive sputtering and electron beam evaporation.

Although GB 1262163 and the Stone and Stulz paper are discussed herein, the technology, in particular the production process described therein, is not suitable for the production of on line glass mirrors which essentially requires processes suitable for use at atmospheric pressure. Accordingly, these references would not be considered by the person skilled in the art as being in any way relevant to the production of on-line mirrors to compete with the conventional "off-line" mirrors discussed above.

In addition, none of the prior art glass constructions using silicon to produce a reflecting layer discloses or relates to the production of mirrors for example, for domestic or architectural purposes, which require opacification of the back surface of the mirror.

SUMMARY OF THE INVENTION

According to the present invention there is provided a mirror assembly comprising a glass substrate, a low transmissivity reflecting coating on the substrate and an opacifying member which is assembled adjacent to the glass substrate for a front surface mirror or the reflecting coating for a back surface mirror.

The present invention further provides a method of producing a mirror assembly comprising depositing onto a hot ribbon of glass during the production process a low transmissivity reflecting coating and assembling an opacifying member adjacent to the glass substrate or the reflecting coating of the mirror so formed.

The present invention still further provides a back surface mirror having safety performance comprising a glass substrate, a low transmissivity reflecting coating on the back surface of the substrate and a translucent plastics film adhered to the reflecting coating by an opaque pressure-sensitive adhesive.

The present invention yet further provides an opacifying member for a safety backed mirror comprising a translucent plastics film carrying an opaque pressure-sensitive adhesive.

The opacifying member is preferably a substantially opaque layer which is assembled with the mirror by being disposed on the side of the mirror which is to be remote from the source of light to be reflected in use. Thus for back surface (Face 2) mirrors, the opacifying member would usually be applied over the outer layer of the reflecting coating and for front surface (Face 1) mirrors the opacifying member would usually be applied over the back surface of the glass substrate.

The coated ribbon is cut on-line to form individual mirrors, and will usually be further cut off-line to provide separate mirrors of the required size. The opacifying member may be then assembled onto the mirrors off-line preferably before further cutting of the mirrors off-line.

The opacifying member preferably comprises a self-adhesive plastics film. The plastics film is transluscent or opaque and carries a transluscent or (when the film is transluscent) an opaque pressure-sensitive adhesive. Carbon black is preferably present in the adhesive as an opacifier. The adhesive is preferably an acrylic-based adhesive. The plastics film is preferably a polyolefin film, such a film of polyethylene or polypropylene which is preferably biaxially oriented. Such biaxial orientation can enhance the impact performance of the safety backed mirror. Alternatively, the plastics film comprises a polyester film. The films may be clear and transparent, or coloured. A most preferred film is a polypropylene film carrying an acrylic adhesive which in its pressure-sensitive form is known for use with polyester films employed for use in imparting bomb-blast protection or solar control to glazings, which adhesive is known to be compatible with glass. A typical self-adhesive film has a total thickness of around 90 microns, the plastics film and the adhesive having respective approximate thicknesses of 60 and 30 microns.

The adhesion between the rear surface of the mirror and the self-adhesive plastics film can be enhanced by the use of a primer which is applied either to glass surface for a front surface mirror or to the reflecting coating for a back surface mirror before the application of the self-adhesive plastics film thereover. The primer is preferably an organosilane, preferably having amino or epoxy end groups, and in particular the primer may be aminopropyltrimethoxysilane in aqueous solution. That primer is stable in deionised water and wets the underlying surface to be covered by the self-adhesive film. It may be applied as a 2% aqueous solution in deionised water.

In an alternative embodiment of the present invention, the opacifying member comprises a separate lamina having a face assembled in contact with the rear surface of the coated substrate. Preferably, the opacifying member of the mirror assembly comprises a board having a darkened surface, most preferably a matt surface, which is assembled, for example, by the use of framing members or other mechanical attachments to the rear surface of the mirror. The board may for example comprise hardboard painted with a black matt paint with the painted surface assembled, for a back surface mirror, adjacent to the reflecting coating of the mirror. Alternatively, the opacifying member may comprise black paper.

In further embodiments of the invention, the opacifying member may comprise paper, cardboard or a laminar material having a patterned and/or coloured surface. In these embodiments, the resultant mirror has a decorative effect, for example when paper having a marbled pattern is employed, and/or may have a coloured background effect.

In each of those specified embodiments, the opacifying member is assembled together with the glass substrate carrying the reflecting coating to form a unitary mirror assembly as a composite assembly. However, in a further alternative embodiment the opacifying member may comprise a wall of a building, preferably having a darkened surface adjacent the mirror, and the mirror assembly of the present invention comprises the glass substrate carrying the reflecting coating assembled onto the wall.

Preferably, the reflecting coating comprises a reflecting layer and at least two reflection enhancing layers whereby the mirrors have a visible light reflection of at least 70%. The reflecting coating may have a transmissivity of from 1 to 15%, more preferably from 3 to 10%, in visible light, (measured when carried on a clear glass substrate).

In this specification the terms "reflecting layer" and "reflection enhancing layer" are intended to indicate the relative interrelationship between the layer positions. Thus, the reflecting layer is, in use, furthest from the source of light to be reflected and the reflection enhancing layers are between the light source and the reflecting layer. The term "reflecting layer" is not necessarily intended to imply that that layer is the primary contributor to the overall reflection of the reflecting coating as compared to the other layers of the coating. In certain embodiments the largest contributor to the overall reflection may be a reflection enhancing layer.

Thus for front surface mirrors the inner of the said three layers is the reflecting layer and intermediate and outer layers act as reflection enhancing layers, and for back surface mirrors the outer of the said three layers is the reflecting layer and the intermediate and inner layers act as reflection enhancing layers. The inner layer is identified as the layer of the coating nearest to the glass and the outer layer as the layer furthest from the glass of the said three layers.

It is known in the art that refractive index varies with wavelength. In this specification and claims, references to "refractive index" are intended to mean (in conventional manner) the refractive index for light of wavelength 550 nm and, in assessing and quoting refractive index values, any imaginary part of the refractive index is disregarded.

The expression "visible light reflection", as used in the present specification and claims, refers to the percentage of light reflected under Illuminant D65 source 1931 Observer Conditions.

The reflecting layer may have a high refractive index and the reflection enhancing layers may have high and low refractive indices so that the resultant stack of layers has successive high, low and high refractive indices.

The desired high reflection may be achieved using layer thicknesses such that reflections from the interfaces between the said coating layers reinforce reflections from the outer surface of the said outer layer (for front surface mirrors) or the inner surface of the said inner layer (for back surface mirrors). The materials of the inner and outer layers are preferably selected so that the aggregate refractive index of the materials of the two layers is at least 5.5 when the reflecting layer is of high refractive index.

Silicon is preferably used for at least one of the inner and outer layers because (a) it may have a particularly high refractive index and (b) it is readily deposited on-line on hot glass, for example, by the processes described in GB 1507465, GB 1507996 and GB 1573154.

The refractive index of silicon may be as great as about 5, (see P. J. Martin, R. P. Netherfield, W. G. Sainty and D. R. McKenzie in Thin Solid Films 100 (1983) at pages 141–147) although lower values are often encountered.

It is believed that, in practice, the value varies depending on the precise physical form of the silicon and the presence of any impurities, for example oxygen, nitrogen or carbon. For the purpose of the present invention, the presence of such impurities may be tolerated (and indeed, it is difficult in practice to produce on-line silicon coatings without significant oxygen and/or carbon incorporation) provided the refractive index is not reduced below about 2.8. Thus the term "silicon" as used herein with reference to layers of relatively high refractive index refers to material which is predominantly silicon, but may contain minor proportions of impurities, provided its refractive index is at least 2.8.

While its high refractive index and ease of deposition favour the use of silicon, the high absorption of silicon leads to a reduction in the reflection. When only one of the inner and outer layers is of silicon, the other (preferably the inner layer for back surface mirrors and the outer layer for front surface mirrors) must be of a material having a higher refractive index than the intermediate layer (and of at least 1.6) and is preferably of low absorption in the visible region of the spectrum. Preferred materials, other than silicon, for a layer of relatively high refractive index are materials having a refractive index in the range 1.9 to 3.0, usually 2.0 to 2.7 and include tantalum oxide, titanium oxide, tin oxide and silicon oxides (including silicon oxides containing additional elements, for example nitrogen and carbon). The amount of such additional elements in silicon oxide can be varied so as to vary the refractive index because the refractive index is composition-dependent. The deposited silicon oxides are generally not stoichiometric. In general, the higher the refractive index of a material, and the lower its visible light absorption, the more effective it will be as a reflecting layer or reflection enhancing layer of high refractive index; expressed in another way, a reduction in the refractive index of the material may be compensated for by a reduction in its visible light absorption.

The intermediate layer i.e. the reflection enhancing layer adjacent the reflecting layer, which is of relatively low refractive index, has a refractive index lower (and in any event below 3) than that of the inner and outer layers of relatively high refractive index.

In general, the lower the refractive index (for a layer of given light absorption) of the intermediate layer, the higher the reflection that can be achieved. The layer of relatively low refractive index will usually have a refractive index below about 2, and it is generally preferred to use a layer of refractive index less than 1.8.

It is also preferred to use as the intermediate layer a material which is substantially non-absorbing in the visible region of the spectrum in order to increase the total light reflection. A suitable and convenient layer material is silicon oxide, which may however contain additional elements such as carbon or nitrogen, and the term "silicon oxide" is used herein to encompass silicon oxides additionally containing other elements, for example, silicon oxides containing carbon and/or nitrogen and, when used with reference to the intermediate layer, having a refractive index of less than 2. Surprisingly, it is found in practice, that adjacent layers of silicon and silicon oxide can be applied pyrolytically to the glass without interdiffusion or interactions which would cause unacceptable reduction in the refractive index of the silicon or increase in the refractive index of the silicon oxide; the adjacent layers of silicon and silicon oxide appear to remain, at least in terms of their optical performance, separate and distinct. However, it may be that at the interfaces of the layers there exist physically narrow interaction zones with steep refractive index gradients that do not alter the optical characteristics of the mirror. Another material which may be used for the intermediate layer is aluminium oxide.

Some of the coating materials, especially silicon, which may be used to form the outer layer of high refractive index have limited scratch resistance and, if a more durable product is required, an additional protective layer of a harder material, for example of tin oxide, may be deposited over said outer layer. It will be appreciated that, if such a protective layer is used on front surface mirrors, it should be of a material (and tin oxide and titanium oxide are examples) that has a low light absorption in the visible region of the spectrum in order to maintain the light reflection of the product, and should be of an optical thickness subtantially different from a quarter wavelength to avoid suppressing the reflection from the outer layer; if used, such a protective layer will typically have a thickness in the region of 10 nm to 30 nm. An outermost layer, of silicon, titania or the above-described protective layer, provides chemical durability to the mirrors. This is a real technical advantage over the known silver mirrors.

The thicknesses of the layers may be selected, in generally known manner (see for example the prior art referred to above), so that the reflections from the interfaces between the intermediate layer of relatively low refractive index and the inner and outer layers reinforce reflections from either the outer surface of the said outer layer (for front surface mirrors) or the inner surface of said inner layer (for back surface mirrors). This will occur for front surface mirrors when the said intermediate and outer layers have an optical thickness of about n $\lambda$/4 and, for back surface mirrors, when said inner and intermediate layers each have an optical thickness of about n $\lambda$/4 wherein, in each case, $\lambda$ is a wavelength of light in the visible region of the spectrum, i.e. from about 400 nm to 750 nm and n is an odd integer; n may be the same or different for each of the said layers, but is preferably 1 in each case.

It is preferable that, when either (or both) the inner layer or the outer layer is of relatively high refractive index material which is non-absorbing or only weakly absorbing in the visible region of the spectrum, both said inner and said outer layers have a thickness of about n $\lambda$/4, where n and $\lambda$ are as defined above. In this way, reflections from, in the case of front surface mirrors, the interface between the inner layer of relatively high refractive index and the glass and, in the case of back surface mirrors, the face remote from the glass of the outer layer of relatively higher refractive index will reinforce the reflections from the interfaces between the coating layers increasing the overall visible light reflection of the mirrors. On the other hand when both said inner layer and said outer layer are of material which is highly absorbing in the visible region of the spectrum, the thickness of the layer remote from the light source (the reflecting layer) is less critical, since the amount of light passing back towards the light source after reflection at the side of that layer remote from the source will be much reduced by absorption.

To achieve the desired visible light reflection of 70% the thicknesses of the layers of optical thickness about n λ/4 may be selected so that the phase differences of the light of a wavelength of about 500 nm reflected towards the light source from the interfaces between the said coating layers and either (for front surface mirrors) the outer surface of the outer layer or (for back surface mirrors) the inner surface of the inner layer are all within ±40% of a wavelength and preferably within ±20% of a wavelength. The general condition is that all the primary reflected rays from the interfaces and either, for front surface mirrors said outer face or, for back surface mirrors said inner face, be substantially in phase with a phase error not exceeding those percentage values. Preferably, each of the reflection enhancing layers (being in the case of front surface mirrors each of the outer and intermediate layers and in the case of back surface mirrors the inner and intermediate layers) will have an optical thickness of 125 nm ±25%; and, unless the reflecting layer is a metal, or neither inner nor outer layer is non-absorbing or only weakly absorbing in the visible, the reflecting layer will also have an optical thickness of 125 nm ±25%.

The closer the optical thicknesses of the layers are to n.500 nm/4 the more neutral the reflection colour will be, while the closer the optical thicknesses of the layers are to n.550 nm/4 the higher will be the total light reflection. However, it will readily be appreciated, by those skilled in the art, that the reflection colour can be tuned by varying the optical thicknesses of the layers within the range from about one quarter of 400 nm (blue-green reflection) to one quarter of 750 nm (red-yellow reflection); it will also be appreciated that tuning away from about 550 nm will reduce the total visible light reflection of the product.

According to the preferred method of the invention, the layers of the required index are applied to a ribbon of hot glass during the glass production process. The depositions may be carried out in a known manner by liquid or powder spray processes, or by a chemical vapour deposition process, and each of the layers may be deposited by a different type of process. The depositions may be pyrolytic involving decomposition of a compound which is a pre-cursor for the material of the desired layer, possibly by reaction with another compound.

In general, it is convenient to use a chemical vapour deposition process to apply any silicon or silicon oxide (which may contain carbon) layers that may be required. Thus, for example, any silicon layer may be deposited (directly or indirectly) on the hot substrate by chemical vapour deposition from a silane gas, conveniently in a gaseous diluent, for example nitrogen. It is generally most convenient to use monosilane, although other silanes may also be used, such as dichlorosilane. One suitable process for deposition of such a silicon layer is described in GB 1507996. If desired, for example to improve the akali resistance of the silicon coating, the reactant gas may contain a proportion of a gaseous electron donating compound, especially an ethylenically unsaturated hydrocarbon compound, for example, ethylene, as additive.

A layer of silicon oxide containing carbon for use as a reflecting layer or a reflection enhancing layer of high refractive index but low absorption in the visible may similarly be deposited by chemical vapour deposition from a silane gas, conveniently in a gaseous diluent, in admixture with an ethylenically unsaturated hydrocarbon compound, for example ethylene, using a somewhat higher proportion of ethylene to silane than is required to produce a silicon layer. Again, the silane used is conveniently monosilane.

A silicon oxide layer for use as a reflection enhancing layer of low refractive index (i.e. an intermediate layer) may similarly be deposited by chemical vapour deposition from a silane gas, conveniently in a gaseous diluent, in admixture with oxygen or a source of oxygen. A mixture of a silane and an ethylenically unsaturated hydrocarbon, together with carbon dioxide or an alternative oxygen compound which serves as a source of oxygen such as a ketone, for example acetone, may be used. The relative concentrations of silane and the source of oxygen used will depend on the refractive index required; in general, the lower the refractive index required, the larger the proportion of oxygen-containing compound to silane to be used. Again, the silane used is preferably a monosilane.

For metal oxide layers, such as tin oxide or titanium oxide, either a liquid or powder spray process or a chemical vapour deposition will generally be used. Thus, for example, a layer of tin oxide or titanium oxide may be deposited by chemical vapour deposition by reaction of the corresponding gaseous metal chloride and water vapour, or by spraying a non-aqueous solution of the metal chloride onto the hot glass in the presence of water vapour. Thus tin oxide may be deposited by chemical vapour deposition of components selected from tin tetrachloride and water vapour, and an organo tin compound such as diethyl tin dichloride or tetramethyl tin, and oxygen, the oxygen optionally being present in air. The titanium oxide may be deposited by chemical vapour deposition of a titanium alkoxide, such as titanium isopropoxide, optionally in the presence of water or air.

When applying a coating layer to a ribbon of float glass, the chemical vapour deposition techniques can conveniently be carried out inside the float bath i.e. where the glass is supported on a molten metal bath under a protective atmosphere (but preferably after the glass has finished stretching i.e. at a glass temperature below 750° C.), or after the ribbon has emerged from the float bath. When using a gas containing monosilane to deposit silicon, silicon oxide containing carbon, or other silicon oxide layers, it is preferred to carry out the deposition of that layer in the float bath where the glass is at a temperature in the range 600° C. to 750° C. in order to achieve a satisfactory rate of deposition.

When applying a coating layer to a ribbon of float glass by a liquid or powder spray process, it will generally be more convenient to deposit the layer after the ribbon of glass has emerged from the float bath.

The preferred layers—including silicon, silicon oxide, titanium oxide and (undoped) tin oxide used in the practice of the present invention—while reflecting in the visible region of the spectrum, are substantially transparent in the infra red region so that their presence (unlike that of layers of silver traditionally used for mirrors) on the surface of the glass during annealing will not have any substantial detrimental effect on the annealing of the coated glass. Thus, according to a preferred aspect of the present invention, the coating deposited is substantially transparent in the infra-red region of the spectrum. This means that such mirrors can readily be produced on-line in a float glass process because the mirrors can be annealed in known manner.

The process of the present invention is useful for the production of mirrors for a wide range of purposes, including domestic use as mirrors in bathrooms and bedrooms.

The materials, properties and thicknesses of the coating layers, and any additional outer protective layer more durable than and applied over said outer layer, may be selected as discussed above with reference to the method of the invention.

The skilled man will also appreciate that additional low and high refractive index quarter wave (n λ/4 where n is an odd integer, preferably 1) layers may be added to the stack of layers to further enhance the reflection.

It may also be possible to incorporate additional non-quarter wave layers between the said inner and outer layers, although in that event such layers are generally best regarded as forming part of a composite intermediate layer which should, considered as a composite single layer, have a thickness such that the phase differences of the light reflected towards the light source from the interfaces of said composite intermediate layer and the other coating layers and either (for a front surface mirror) the outer surface of the outer layer or (for a back surface mirror) the inner surface of the inner layer are all within ±40% of a wavelength, and preferably within ±20% of a wavelength. Thus the composite single layer will have a refractive index less than the refractive index of either said inner layer or said outer layer and less than 3; preferably such composite single layer will have a refractive index of less than 1.8 and an optical thickness of 125 nm ±25%. Similarly, an additional layer may be included between the inner layer and the glass although, in the case of a back surface mirror, it will then normally be of refractive index intermediate between the refractive index of the inner layer and the glass.

BRIEF DESCRIPTION OF THE DRAWINGS

The invention is illustrated but not limited by the following drawings. In the drawings.

DETAILED DESCRIPTION OF THE PREFERRED EMBODIMENTS

Figure 1:
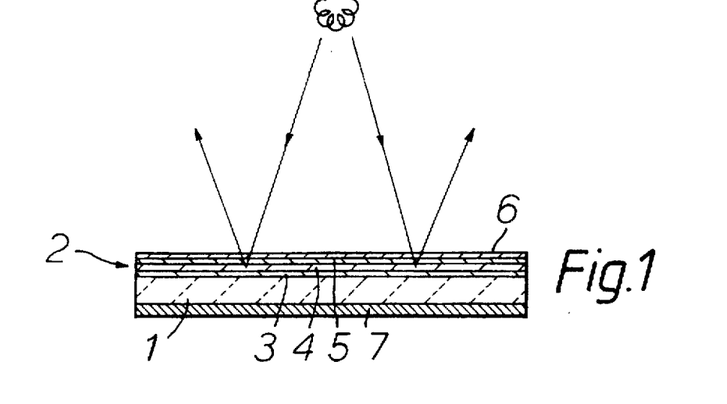
FIG. 1 is a section (not to scale) through a mirror assembly in accordance with a first embodiment of the invention in use as a front surface mirror and having a back opacifying member.

Referring to FIG. 1, a front surface glass mirror comprises a float glass substrate 1 carrying a coating 2 comprising an inner layer 3 of relatively high refractive index, for example of pyrolytic silicon, and intermediate layer 4 of relatively low refractive index, for example of silicon oxide having a refractive index below 1.8 and containing silicon and oxygen in atomic proportions of about 1:2, and an outer layer 5 of relatively high refractive index, for example of pyrolytic silicon. If only one of the layers 3 and 5 of relatively high refractive index is of silicon, it will usually be the inner layer, with a material having a lower absorption for visible light, for example silicon oxide containing carbon, tin oxide or titanium oxide, being used as the outer layer 5. Each of the intermediate layer 4 and the outer layer 5 has an optical thickness of n λ/4, wherein n is an odd integer (preferably 1) and λ is a wavelength of light in the visible region of the spectrum i.e. from about 400 nm to 750 nm. If the inner and outer layers 3 and 5 are of an absorbing material such as silicon, the thickness of the inner layer is less critical, but it may also correspond to an optical thickness of n λ/4 wherein n and λ are as defined above and n is an odd integer preferably 1.

A protective layer 6 more durable than outer layer 5 is applied over layer 5. The protective layer may be of tin oxide, and may be applied by chemical vapour deposition. When the outer layer 5 is of silicon, such a protective layer of tin oxide should be applied only after a surface layer of silicon oxide has been formed on the silicon, for example, as described in U.S. Pat. No. 4,661,381. An opacifying member 7 comprised of an opacified self-adhesive film is applied to the back surface of the glass 1 as an obscuring layer. The film may comprise a blown or foamed film.

Figure 2:
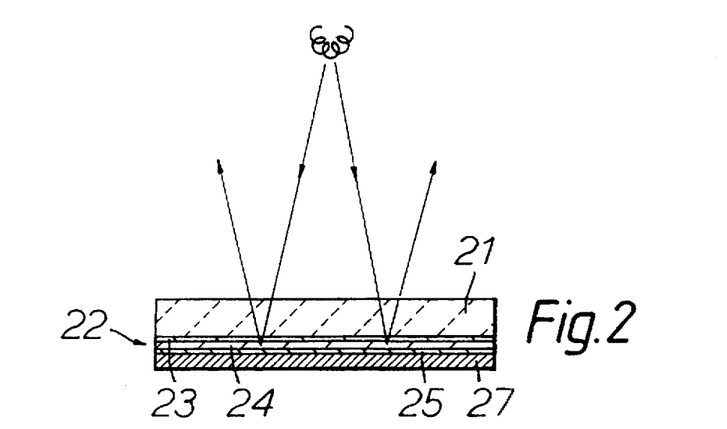
FIG. 2 is a section (not to scale) through a mirror assembly in accordance with a second embodiment of the invention in use as a back surface mirror and having a back opacifying member.

Referring to FIG. 2, a back surface glass mirror comprises a float glass substrate 21 carrying a coating 22 comprising an inner layer 23 of relatively high refractive index, for example of pyrolytic silicon, an intermediate layer 24 of relatively low refractive index, for example of silicon oxide having a refractive index below 1.8 and containing silicon and oxygen in atomic proportions of about 1:2, and an outer layer 25 of relatively high refractive index, for example of pyrolytic silicon. If only one of the layers 23 and 25 of relatively high refractive index is of silicon, it will usually be the outer layer with a material having a lower absorption for visible light, for example silicon oxide containing carbon, or titanium oxide, being used as the inner layer 23. Each of the inner layer 23 and intermediate layer 24 has an optical thickness of n λ/4, wherein n is an odd integer (preferably 1) and λ is a wavelength of light in the visible region of the spectrum i.e. from about 400 nm to 750 nm. If the inner and outer layers 23 and 25 are of an absorbing material such as silicon, the thickness of the outer layer is less critical, but it may also correspond to an optical thickness of n λ/4 wherein n and λ are defined above and n is preferably 1.

The use of titanium oxide as the inner layer instead of silicon has been found to increase the reflectivity of the mirror products. For example, for back surface mirrors, the use of titanium dioxide as the inner layer can increase the reflectivity, as compared to such mirrors having a silicon inner layer, by about 3 to 7%.

An opacifying member 27 comprised of an opacified self-adhesive plastics film is applied over the coating 22 on glass substrate 21 as an obscuring layer.

In each of the embodiments of FIGS. 1 and 2, the opacifying member comprises a self-adhesive plastics film such as a polyolefin film, for example of polyethylene or biaxially oriented polypropylene, or a polyester film. The film may be blown or foamed. The film is preferably translucent and carries an opacified adhesive, with the opacifier of the adhesive comprising carbon black. More preferably, the translucent film is clear and transparent or alternatively it may be coloured. The adhesive is preferably a pressure-sensitive acrylic adhesive which is known for use in adhering plastics films to glass such as for providing bomb-blast protection or solar control.

A typical polyethylene film suitable for use in the present invention is a polyethylene safety film having the product designation AR 677 carrying an acrylic adhesive having the product designation HALSR which is available in commerce from the firm Adhesive Research in the United States. Alternatively, a polyester film having the product designation AR 678B and carrying an acrylic adhesive HA 14 and available in commerce from the company Adhesive Research may be employed.

Particular safety mirror constructions similar to those illustrated in FIGS. 1 and 2, having a glass substrate 4 mm thick (or greater), can pass impact tests in accordance with British Standard BS 6206 or US Standard Z97. These impact tests are commonly employed for testing the impact resistance of safety mirrors. It has also been found that safety mirror constructions in which the self-adhesive safety film was adhered to the back glass surface which was primed by an organosilane passed long term durability tests.

Figure 3:
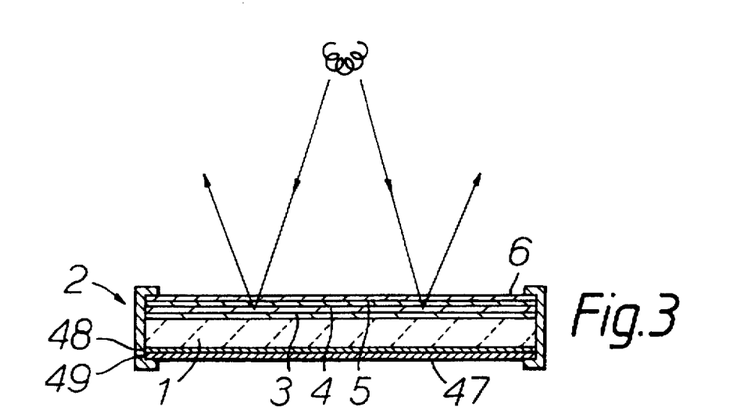
FIG. 3 is a section (not to scale) through a mirror assembly in accordance with a third embodiment of the invention in use as a front surface mirror and having a back opacifying member.

For the front surface (Face 1) safety mirror embodiment of FIG. 1, self-adhesive plastics films may be employed to provide sufficient impact resistance to meet internationally recognised safety standards. Thus in order to meet Class B of British Standard BS 6206 or Category I of US Standard Z97, the plastics film may comprise a black 160 micron thick film of polyethylene, being a blend of low, medium and high density polyethylene, not biaxially oriented, (available from a company called Main Tape in the US) carrying a pressure sensitive solvent-based acrylic adhesive also available from the company Main Tape under the designation MGS 558. The plastics film provides both safety performance and opacification of the mirror. In order to meet Class A of BS 6206 or Category II of US Standard Z97, a double-film construction may be employed, as shown in FIG. 3, in which the opacifying member 47 consists of a twin layer plastics film. The remainder of the mirror construction is the same as that of FIG. 1. In one configuration, the underlying layer 48 comprises a 160 micron thick polyethylene blend plastics film carrying a solvent-based acrylic adhesive and the overlying layer 49 comprises a woven polyolefin scrim carrying a water-based acrylic adhesive. Both layers are available from the company Main Tape. In a second configuration the underlying layer 48 comprises a polyethylene blend film sold by the company Main Tape as meeting Category I of US Standard Z97 and the overlying layer 49 comprises the above-described polyolefin scrim. In a third configuration the underlying layer 48 is 90 microns thick and comprises a biaxially-oriented polypropylene film carrying a solvent-based acrylic adhesive (available from a company called Safecoat in the UK) and the overlying layer 49 comprises the above-described polyolefin scrim. In each of the second and third configurations the underlying layer 48 is adhered to a paint layer which has previously been applied to the glass surface. The paint layer may comprise a paint composition applied in the manner described hereinbelow with reference to Face 2 mirrors.

Figure 4:
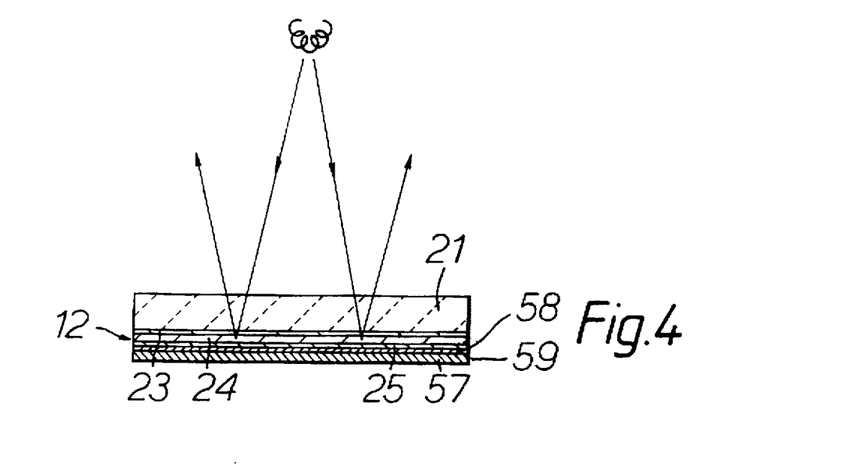
FIG. 4 is a section (not to scale) through a mirror assembly in accordance with a fourth embodiment of the invention in use as a back surface mirror and having a back opacifying member.

For rear surface (Face 2) safety mirrors double-film constructions are employed to provide impact resistance and opacification as shown in FIG. 4. The mirror construction is the same as that of FIG. 2 except for the provision of a paint layer 58 coating the reflecting layer with the plastics film 59 being adhered thereover.

In order to provide back surface mirrors having long term impact resistance meeting internationally recognised standards, it is preferred that the plastics film 59 for back surface mirrors to be adhered to a paint layer which coats the reflecting coating, rather than directly to the reflecting coating. In the absense of such a paint layer, the bond between the plastics film and the substrate surface tends to deteriorate leading to loss of performance. The paint layer may comprise a solvent or water-based paint. Suitable solvent-based paints have a base resin composition similar to those of paints of the type sold under the trade names TREBAX 600 (which is an air drying paint) and 2UL (which is a cross-linked paint)., both paints being available from the company Kemira in the United Kingdom. The paint TREBAX 600 can be dried in air and the paint 2UL is a black unleaded stoving paint which may be cured at a temperature of 120° C. for 2.5 minutes. The preferred solvent-based lead-free paints differ from known backing paints for silvered mirrors (such as those sold as TREBAX 600 and 2UL) by not including any additives (such as lead) for preventing corrosion of an underlying metallic layer. The preferred paints have, as compared to the known mirror backing paints, a high amount of opacifier, such as carbon black. The solvent-based paint layer is around 25 microns thick (when cured) in order to achieve sufficient opacification and be readily curtain coated although thicker layers may be employed. The paint layer has been applied as a single layer, preferably by a curtain coating process, by roller coating or by spraying.

Particularly preferred paint compositions are based on short oil length alkyd resin, preferably modified with an amino resin, preferably a melamine-formaldehyde resin, which is lead-and heavy metal-free (i.e. it does not contain corrosion inhibitors) and contains silane. Such a paint composition can be cured by cross-linking, the curing being at an elevated temperature of at least 120° C. for a period of up to 10 minutes, preferably around 2.5 minutes. This paint composition provides the advantage over known compositions of being readily curable quickly and at low curing temperatures, this being required for cost-effective and commercially acceptable mirror manufacture.

For enhancing the adhesion between the self-adhesive plastics films and the glass surface for Face 1 mirrors a primer may be applied to the underlying surface before application of the self-adhesive plastics film. For enhancing the adhesion between the solvent-based paints and the reflecting coating for the Face 2 mirrors, a primer may be applied to the underlying surface before application of the paint. A preferred primer is an amino silane having methoxy functionality. For both Face 1 and Face 2 mirrors, a suitable primer is a 1-2% solution of aminopropyltrimethoxysilane in deionised water, such a silane being commercially available from Union Carbide, USA under the trade name A1110. An epoxy silane as opposed to an amino silane may alternatively be employed. The primer may be incorporated into the paint composition preferably in an amount of from 1 to 6% by weight based on the weight of the paint at a typical solids contents of about 62%, most preferably around 1% for a back surface mirror and around 5% for a front surface mirror instead of being applied as an initial primer layer.

Instead of solvent-based paints, water-based paints may be employed. The water-based paints provide the advantages that the absence of solvent is environmentally more acceptable than with solvent-based paints and no solvent abatement equipment is required. Suitable water-based paints are water-borne alkyds or acrylic emulsions. We have found that using such water-borne alkyds there is no need for a primer layer between the paint and the underlying surface. The water-based alkyd paints are typically cured at 120° C. for up to 10 minutes, preferably around 2.5 minutes. The coatings are typically applied at a wet thickness of 50 microns, drying to a thickness of around 25 microns, although a dry thickness of as low as 18 microns may be employed.

In order to meet class B of BS 6206 or category I of US Standard Z97, the opacifying member 27, which is adhered to a paint layer coating the reflecting layer, comprises either a 160 micron thick black pressure-sensitive polyethylene blend film carrying a water-based acrylic adhesive specified above, the film being available from Main Tape, or a 90 micron thick biaxially oriented polypropylene film carrying a solvent-based acrylic adhesive, the film being sold under the designation Safecoat OPP by Safecoat in the UK. For meeting Class A of BS 6206 or Category II of US Standard Z97, the plastics film 58, which also is adhered to the paint layer 57 coating the reflecting layer, comprises either the woven scrim polyolefin carrying a water-based acrylic adhesive as described above which is available from Main Tape or a self-adhesive polyolefin scrim sold in the UK by a company called Macbak under the designation Macbak 7000.

The present invention is further illustrated with reference to the following Example of the manufacture of a Face 1 safety mirror.

EXAMPLE

A mirror coating was deposited on line onto a 4 mm float glass substrate, the reflecting coating having the structure illustrated in FIG. 1. The mirror substrate was cut to form a sheet having dimensions 1930 mm×865 mm. A self-adhesive plastics film was applied to the glass surface using a film laminating apparatus known for use in the manufacture of safety mirrors. The film was applied to the glass surface, as opposed to the reflecting coating, so as to make a Face 1 mirror. The film consisted of a black polyethylene blend film 160 microns thick carrying a solvent-based pressure-sensitive acrylic adhesive. The film is available in commerce from the company Main Tape identified hereinabove and the adhesive is designated by Main Tape as MGS 558.

After the lamination process, the glass/film laminate was stored for a period of 7 days at room temperature. The safety mirror was then subjected to impact testing in accordance with the procedure specified in BS 6206, Class Bo with the film-side of the safety mirror being in tension (i.e. the film being on the side of the mirror away from the side of impact). The glass fractured safely and met the safety criteria specified in Class Bo of BS 6206. In other words, the glass fragments remained adhered together by the self-adhesive plastics film.

Figure 5:
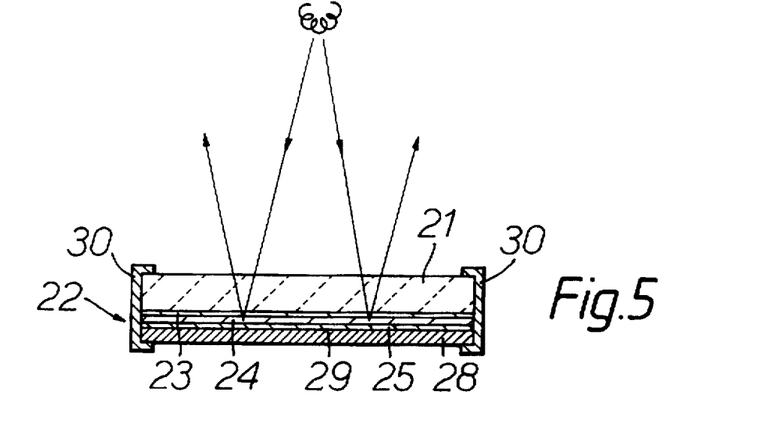
FIG. 5 is a section (not to scale) through a mirror assembly in accordance with a fifth embodiment of the invention in use as a back surface mirror and having a back opacifying member.

FIG. 5 illustrates a further embodiment of the present invention in which the mirror assembly comprises the mirror structure of FIG. 2, with like features being identified with like reference numerals, but with the opacifying member 28 being comprised of a board, such as hardboard, having a dark, matt surface 29 adjacent the back surface of the mirror instead of a self-adhesive plastics film. The board 28 is assembled together with the mirror by frame members 30. The surface 29 may be painted with a black matt paint. Alternatively, the opacifying member may comprise paper which may have a black surface or a coloured and/or decorative surface. The decorative surface may have a marbled decoration or any other decorative effect such as regular or irregular markings, which are visible in the resultant mirror surface.

The invention also provides framed front surface mirrors. Thus the embodiment of FIG. 3 may be provided with a frame (as shown) similar to the frame 30 as shown in FIG. 5 and the embodiment of FIG. 5 may be modified by the mirror being a front surface mirror instead of a back surface mirror. These additional embodiments provide a real technical advance over known framed mirrors in that, because the front parts of the frame members are assembled adjacent to the Face 1 mirrored surface, it is not possible to view the rear surface of those front parts in the mirror, as is possible with back surface mirrors which leads to an unsightly black band being visible around the Face 2 mirror edge. No such black band is visible in the framed front surface mirrors of these embodiments.

Figure 6:
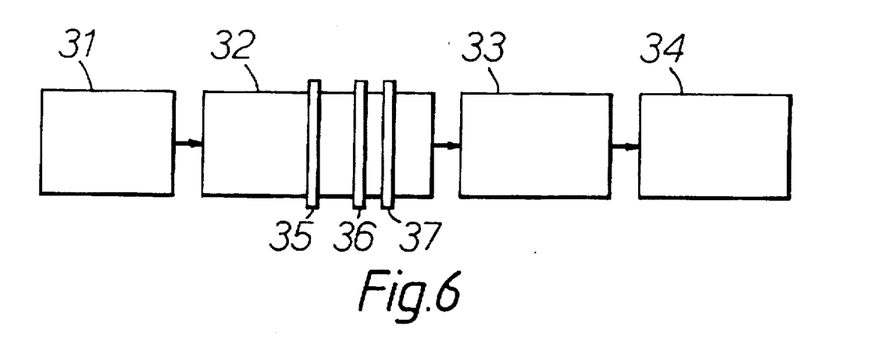
FIG. 6 is a diagrammatic representation of the arrangement of coating stations on a float glass production line for production of back surface mirrors in accordance with an embodiment of the method of the present invention.

FIG. 6 illustrates diagrammatically, a float glass production line comprising a glass melting section 31, a float bath section 32 for forming the molten glass into a continuous ribbon, a lehr section 33 for annealing the said glass ribbon and a warehouse section 34 for cutting pieces of glass from the ribbon for storage and/or distribution and use. For the production of mirrors in accordance with the method of the invention, each of the three coating stations for respectively applying the inner, intermediate and outer layers will normally be located in or between the float bath section 32 and lehr section 33; in the illustrated embodiment of the inventions, the said three coating stations 35,36,37 are arranged in the float bath section 32 as shown in FIG. 6. However, in alternative embodiments, one or each of the coating stations for applying inner, intermediate and outer layers in accordance with the invention may be located between the float bath section 32 and the lehr section 33. The location of each coating station is selected to be at a position where the glass ribbon has substantially reached its final thickness (usually at a glass temperature of around 750° C.) so that it is not subject to further stretching which might crack any coating applied, but where its temperature remains sufficiently high for formation of a further pyrolytic layer (usually a glass temperature of at least 300° C.).

The mirrors are removed from the warehouse section and conveyed to a mirror assembly manufacturing station at which a self-adhesive plastics film is applied to the surface of the mirror to form a mirror assembly of a construction such as that shown in FIGS. 1 or 2, a plurality of plastics films are adhered to the mirror to form the construction shown in FIG. 3, the reflecting layer is coated with a paint layer and then a plastics layer is adhered thereover, after curing of the paint, to form the construction shown in FIG. 4, or a board or other type of separate opacifying member is assembled together with the mirror to form a mirror assembly of a construction such as that shown in FIG. 5.

The mirror assemblies of the present invention and the process for producing such a mirror assembly have numerous advantages of the prior art. The present invention in certain embodiments enables mirror assemblies, particularly safety mirrors, to be manufactured easily and inexpensively by removing the need for paint layers which are conventionally applied to the back surface of known mirrors such as silvered mirrors. In safety mirrors made in accordance with the present invention, the safety film provides the dual function of providing not only safety performance as a result of the properties of the self-adhesive plastics film but also opacification of the back surface of the mirror. The opacification is required because of the low transmissivity i.e. non-opaque reflecting coating which is employed in the mirror. Opacification of the mirror is required for numerous end applications of the mirrors of the present invention. Use of a self-adhesive plastics film to provide safety performance and opacification may provide the advantage of the removal of the requirement of opacifying paint layers which leads to a reduction in the cost of manufacturing and a reduction in the manufacturing time because of the removal of an additional painting step. In addition, the manufacture of a mirror assembly having a separate opacifying member for example in the form of paper or board assembled to the back surface of a mirror obviates the requirement of opacifying paint layers which are in the prior art required to be applied to the back surface of the mirror. In the known silvered mirrors, paint layers are required to be applied over the metallic reflecting layers in order to provide corrosion protection to the metallic layers. The use of chemically stable reflecting layers in accordance with the preferred embodiment of the present invention for the manufacture of mirror coatings as compared to the use of potentially corrodable metallic layers in the prior art obviates the requirement for paint layers providing corrosion resistance. The known backing paint requires corrosion inhibitors, such as lead. The mirrors made in accordance with the present invention are more environmentally friendly because no such corrosion resistant paints are required. The opacifying member employed in the present invention is merely required to opacify the mirror structure in view of the transmissivity of the reflecting coating. There is no requirement chemically to protect the coating as is required by the prior art.

The resultant coated mirrors made in accordance with the present invention, because they incorporate non-metallic reflecting mirrors and can be made on-line, can have a lower cost than a silvered mirror but can have a longer warranted life time for various architectural applications.

What we claim is:

1. A front surface mirror assembly comprising a glass substrate, a low transmissivity reflecting coating on the substrate and an opacifying member which is assembled adjacent to the glass substrate, the opacifying member comprising a self-adhesive plastics film which comprises a polyethylene or polypropylene film carrying a layer of a pressure-sensitive acrylic adhesive, and the opacifying member further comprising a woven polyolefin scrim layer which is adhered to the back surface of the plastics film.

2. A front surface mirror assembly according to claim 1 further comprising a primer which assists the adhesion of the self-adhesive film to the underlying surface.

3. A front surface mirror assembly according to claim 2 wherein the primer comprises an organosilane.

4. A front surface mirror assembly according to claim 3 wherein the primer comprises aminopropyltrimethoxysilane in aqueous solution.

5. A front surface mirror assembly according to claim 1 wherein the polyethylene film is around 160 microns thick.

6. A front surface mirror assembly according to claim 1 wherein the polypropylene film is around 90 microns thick.

7. A front surface mirror assembly according to claim 1 wherein the reflecting coating comprises a reflecting layer and at least two reflection enhancing layers whereby the mirror has a visible light reflection of at least 70%.

8. A front surface mirror assembly according to claim 7 wherein the outer surface of the reflecting coating comprises silicon.

9. A front surface mirror assembly according to claim 1 wherein the reflecting coating has a transmissivity of from 1 to 15% in visible light.

* * * * *